US012269989B2

(12) United States Patent
Scott

(10) Patent No.: US 12,269,989 B2
(45) Date of Patent: Apr. 8, 2025

(54) HYDRATE-INHIBITING CHEMICAL INJECTOR AND RELATED METHODS

(71) Applicant: David Scott, Grande Prairie (CA)

(72) Inventor: David Scott, Grande Prairie (CA)

(*) Notice: Subject to any disclaimer, the term of this patent is extended or adjusted under 35 U.S.C. 154(b) by 361 days.

(21) Appl. No.: 17/715,695

(22) Filed: Apr. 7, 2022

(65) Prior Publication Data
US 2022/0325166 A1 Oct. 13, 2022

(51) Int. Cl.
C09K 8/52 (2006.01)
F23N 1/08 (2006.01)
F23N 5/00 (2006.01)

(52) U.S. Cl.
CPC .............. C09K 8/52 (2013.01); F23N 1/085 (2013.01); F23N 5/00 (2013.01); C09K 2208/22 (2013.01); F23N 2227/22 (2020.01); F23N 2235/14 (2020.01); F23N 2235/18 (2020.01); F23N 2239/04 (2020.01)

(58) Field of Classification Search
CPC ......... C09K 8/52; C09K 2208/22; F23N 5/00; F23N 2227/22
USPC .......................................................... 431/5
See application file for complete search history.

(56) References Cited

U.S. PATENT DOCUMENTS

| 4,007,755 A | 2/1977 | Lerner |
| 5,936,040 A | 8/1999 | Costello |
| 6,076,278 A | 6/2000 | Bradley |
| 6,369,004 B1 | 4/2002 | Klug |
| 6,981,848 B1 | 1/2006 | Cessac |
| 2006/0046218 A1* | 3/2006 | Joklik ................. F02D 41/1497 431/75 |
| 2006/0254536 A1* | 11/2006 | Waters .................... F02M 25/00 123/1 A |
| 2009/0095351 A1 | 4/2009 | Greening |
| 2011/0085916 A1 | 4/2011 | Talbot |
| 2012/0167465 A1 | 7/2012 | Zeck |
| 2016/0207080 A1 | 7/2016 | Casey |

FOREIGN PATENT DOCUMENTS

| CA | 2178367 | 4/2001 | |
| CA | 2651619 | 7/2010 | |
| CA | 2651619 A1 * | 7/2010 | ............... F17D 1/05 |
| CA | 2746245 | 10/2011 | |

(Continued)

OTHER PUBLICATIONS

Hydrate problems in production, PetroWiki, retrieved online Mar. 21, 2021, believed to be available as early as Jan. 19, 2016, 5 pages.

(Continued)

Primary Examiner — Vivek K Shirsat
(74) Attorney, Agent, or Firm — Robert A. Nissen

(57) ABSTRACT

Systems and methods of injecting hydrate inhibiting chemicals into a gaseous fuel line of a burner are described. One system includes: an oilfield burner; a gaseous fuel line connected to the oilfield burner; a storage tank containing hydrate-inhibiting chemicals; a hydrate-inhibiting chemical supply line connected between the storage tank and the gaseous fuel line; and a control valve connected to control flow in the hydrate-inhibiting chemical supply line in response to the operation of the oilfield burner. A kit may be provided with at least the hydrate-inhibiting chemical supply line and control valve.

20 Claims, 3 Drawing Sheets

(56) References Cited

FOREIGN PATENT DOCUMENTS

| | | |
|---|---|---|
| CN | 201771483 | 3/2011 |
| CN | 103348175 | 10/2013 |
| EA | 031408 | 12/2018 |
| RU | 2577676 | 3/2016 |
| WO | 2005073615 | 8/2005 |
| WO | 2010111226 | 9/2010 |

OTHER PUBLICATIONS

Emerson, The Significance of Reliable Pressure Control in Oilfield Burner Systems, believed to be available as early as Oct. 2018, 6 pages.
Sciencedirect, Hydrate Control, retrieved online Mar. 29, 2021, 7 pages.
English machine translation of EA031408, Foreign reference #5, retrieved online Jan. 17, 2023, 86 pages.
English machine translation of CN201771483, Foreign reference #7, retrieved online Jan. 17, 2023, 7 pages.
English machine translation of CN103348175, Foreign reference #8, retrieved online Jan. 17, 2023, 25 pages.
English machine translation of RU2577676, Foreign reference #9, retrieved online Jan. 17, 2023, 5 pages.

\* cited by examiner

HYDRATE-INHIBITING CHEMICAL INJECTOR AND RELATED METHODS

TECHNICAL FIELD

This document relates to hydrate-inhibiting chemical injectors and related methods.

BACKGROUND

The following paragraphs are not an admission that anything discussed in them is prior art or part of the knowledge of persons skilled in the art.

Canadian patent application no. 2,651,619 by Toporowski discloses a methanol injection system to prevent freezing of a natural gas fuel line. The system provides a low maintenance delivery of a constant flow of methanol into a burner fuel line without any energy input.

SUMMARY

Systems and methods of injecting hydrate inhibiting chemicals into a gaseous fuel line of a burner are described.

A system is disclosed comprising: an oilfield burner; a gaseous fuel line connected to the oilfield burner; a storage tank containing hydrate-inhibiting chemicals; a hydrate-inhibiting chemical supply line connected between the storage tank and the gaseous fuel line; and a control valve connected to control flow in the hydrate-inhibiting chemical supply line in response to the operation of the oilfield burner.

A kit includes at least the hydrate-inhibiting chemical supply line and control valve.

A hydrate-inhibiting chemical injector is disclosed comprising: a storage tank connector for connecting in use to a storage tank containing hydrate-inhibiting chemicals; a gaseous fuel line connector for connecting in use to a gaseous fuel line to an oilfield burner; a hydrate-inhibiting chemical supply line connected between the storage tank connector and gaseous fuel line connector; and a control valve connected to control flow in the hydrate-inhibiting chemical supply line in response to the operation of the oilfield burner.

A method is also disclosed comprising: supplying gaseous fuel to operate an oilfield burner; supplying hydrate-inhibiting chemicals to the gaseous fuel; and automatically controlling the supply of the hydrate-inhibiting chemicals in response to the operation of the oilfield burner.

In various embodiments, there may be included any one or more of the following features: The control valve is connected to turn on and off when the oilfield burner is on or off, respectively. The oilfield burner has a burner pilot valve; and the control valve is connected to control flow in the hydrate-inhibiting chemical supply line in response to the burner pilot valve. A control line connected between the burner pilot valve and the control valve. The control valve and the burner pilot valve are connected in series. The control valve comprises a solenoid. The control valve comprises a pressure control valve. The pressure control valve is operated via a pressure line connected between the gaseous fuel line and the pressure control valve. The pressure control valve comprises a three way pilot valve. An equalization line connected between the gaseous fuel line and the storage tank or hydrate-inhibiting chemical supply line to equalize gas pressure. The control valve is located on the equalization line. A drip sight glass on the hydrate-inhibiting chemical supply line. The hydrate-inhibiting chemicals comprise liquid methanol. The system structured to gravity feed the hydrate-inhibiting chemicals into the gaseous fuel line. Automatically controlling comprises shutting off and turning on the supply of the hydrate-inhibiting chemicals when the oilfield burner is off or on, respectively. Automatically controlling further comprises automatically controlling the supply of the hydrate-inhibiting chemicals in response to pressure of gaseous fuel supplied to the oilfield burner. Supplying hydrate-inhibiting chemicals comprises metering the hydrate-inhibiting chemicals by gravity into the gaseous fuel.

The foregoing summary is not intended to summarize each potential embodiment or every aspect of the subject matter of the present disclosure. These and other aspects of the device and method are set out in the claims.

BRIEF DESCRIPTION OF THE FIGURES

Embodiments will now be described with reference to the figures, in which like reference characters denote like elements, by way of example, and in which.

DETAILED DESCRIPTION

Figure 1:
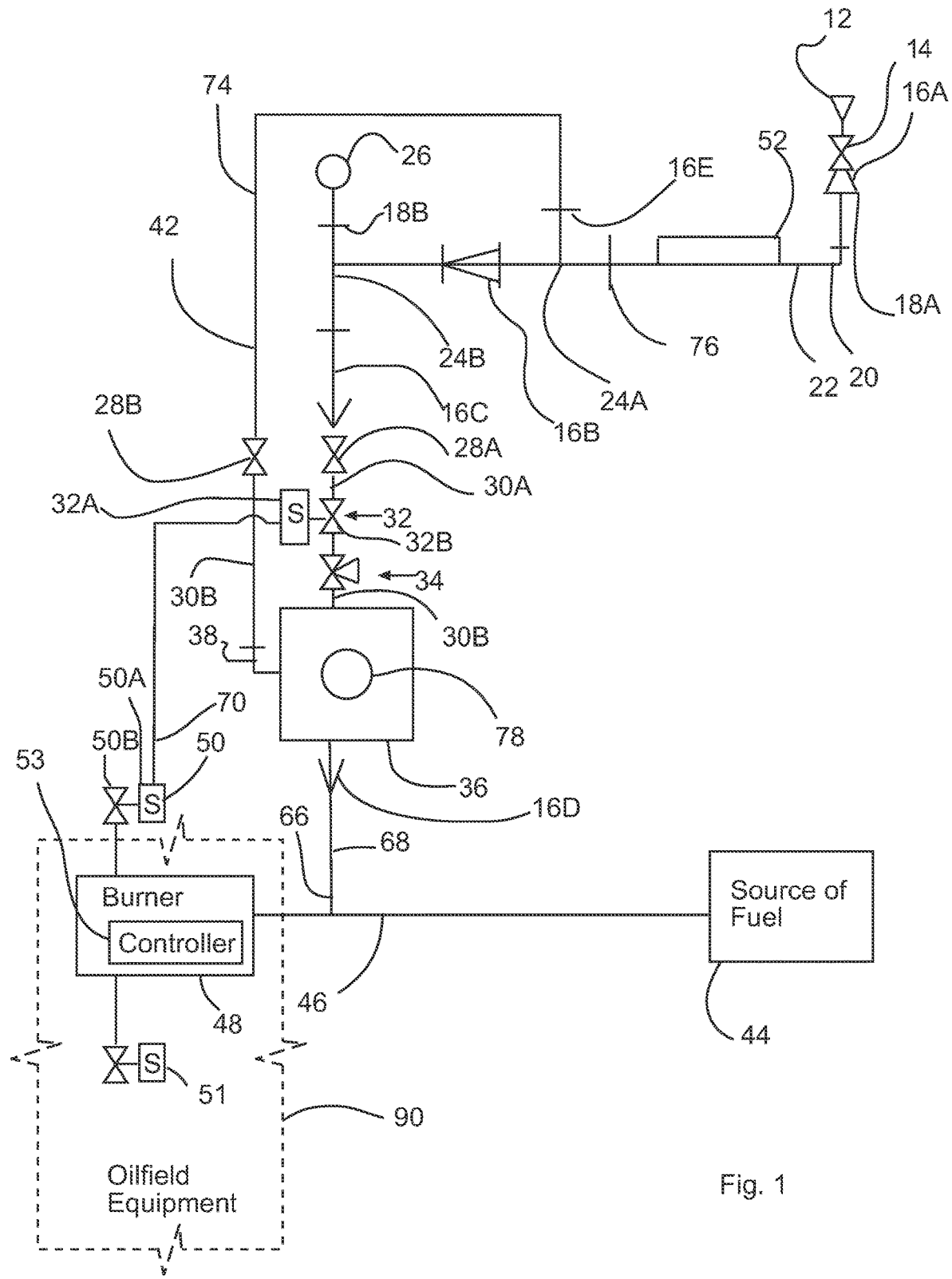
FIG. 1 is a schematic of a system of supplying hydrate-inhibiting chemical(s) to a gaseous fuel supplied to a burner, in an oilfield application, with chemical supply linked to the operation of a pilot valve of the burner.

Immaterial modifications may be made to the embodiments described here without departing from what is covered by the claims.

Gaseous hydrocarbon-based fuels are used as a source of heat or energy in a variety of applications, such as equipment heating, drive systems for vehicles, and electricity generation. Such fuels may be used to carry out combustion to release energy, which may then be harnessed to produce electricity or motive force, or released as heat energy. Common examples of gaseous fuels include one or more of methane, ethane, and propane, butane, pentane, and others. Natural gas is an example of a naturally occurring hydrocarbon gas mixture consisting primarily of methane, but commonly including varying amounts of other higher alkanes, such as ethane or propane, and sometimes a small percentage of carbon dioxide, nitrogen, hydrogen sulfide, or helium. Propane and/or ethane may be produced as a by-product of natural gas processing and crude oil refining. Gaseous fuels may be stored under pressure, for example in a liquid or gaseous form, and if liquid, may be vaporized prior to use in a combustion reaction.

A burner may be used to combust gaseous fuel to release heat that may then be used to increase the temperature in an area, in a structure or building, or of a piece of equipment. A classic example of a burner is a gas burner, which is a device that produces a controlled flame by mixing a fuel gas such as acetylene, natural gas, or propane with an oxidizer such as the ambient air or supplied oxygen, and allowing for ignition and combustion. The resultant flame may be for heat, infrared radiation, or visible light. Some burners, such as gas flares, may be used to dispose of unwanted or uncontainable flammable gases. Some burners are operated to produce carbon black. A burner has many applications such as soldering, brazing, and welding, the latter using oxygen instead of air for producing a hotter flame, which is required for melting steel. Many chemistry laboratories use natural-gas fueled Bunsen burners. In domestic and commercial settings gas burners are commonly used in gas stoves and cooktops.

The burner plays an integral role in oil and gas production. A burner may be used to generate the heat necessary for separating an oil, gas and water mixture produced by a well that penetrates a hydrocarbon formation underneath the ground surface, and to keep the gases in vapor phase during transportation through pipelines. An oilfield burner may use a portion of the gas coming out of the well as the fuel to produce the flame for heating. The gases extracted from the well may enter a burner skid (commonly referred to as a burner fuel train) at a high pressure and hence may need to be pressure controlled for use in the burner.

An oilfield burner may be a gas-fired combustor used by oil and gas producers to generate the heat required for process applications. A separator burner may provide heat to a separation unit such as a heater treater. An inline burner may provide heat to maintain temperature within piping and to prevent hydrate formation. A tank burner may provide heat to maintain temperature in a storage tank, such as a crude oil storage tank. An oilfield burner may operate intermittently or continuously, depending on ambient temperature and intended function, such burners play a significant role in upstream oil and gas processing operations. Oilfield burners may also be used in one or more of the following: direct heaters, indirect heaters, treaters, vaporizers, process heaters, de-salters, dehydrators, multiple fired units, line heaters, tank burners, and gas dryers.

An oilfield burner may have a method or mechanism to turn the burner on and off, regardless of whether the burner is intended to be run generally continuously or intermittently. Historically, one method of igniting a burner involved using a long stick with a burning rag at the end, to ignite a flow of gas through a burner nozzle. By contrast, a modern burner may incorporate a control system for igniting and quenching a flame. A control system for the burner may be a manual or automatic system. Both types of systems will include a control valve of some type. A manual system may use a manually-operated control valve, such as a ball or other type of valve to supply or quench fuel to a burner nozzle. An automatic system may use a feedback and/or timing system to automatically ignite or quench the burner.

A burner may have a suitable design, such as on incorporating both a main burner and a pilot burner. The main burner may have a nozzle or series of nozzles sized to provide gas flow therethrough to provide sufficient combustion to achieve the desired purpose of the burner. The pilot burner may have a relatively smaller nozzle than the main burner. The pilot may function to ignite, and in some cases maintain, ignition of gaseous flow through the main burner. The pilot nozzle will often supply gaseous fuel flow to a suitable location adjacent or near the main burner, for example within a combustion chamber of the burner downstream of the main nozzle. The pilot and main burner may be controlled via respective main and pilot control valves, or in other suitable manners.

The potential safety and operational issues with a traditional, manually-operated burner is driving the industry towards a safer and automated method through the use of an automated system such as one incorporating a controller, such as a burner management system (BMS). A BMS may include an electronic panel that ensures a safer method for control and monitoring of burner units. The BMS may operate as the brain of the burner systems to perform any of a variety of functions. A BMS may ensure safe burner startup once proper conditions are met and initiate shutdown if unsafe conditions occur. A BMS may reignite the burner flame automatically in a controlled routine in the event that the flame has been extinguished. A BMS may monitor and ensure that the burner and pilot flame are lit. A BMS may modulate the burner flame intensity based on temperature needed for the application. A BMS may allow a user to monitor flame status, change temperature set points and even shut down from a remote location.

Referring to FIG. 1, a controller 53 (such as a BMS) for a burner 48 may direct burner operation. For example, during burner 48 startup, the controller 53 may keep all the valves, such as pilot and main burner solenoid valves 50 and 51, respectively, closed for a pre-programmed purge time, ensuring residual gas flows out of the fuel train. The pilot and burner may operate with different pressure ranges of feed gas, for example 3-15 PSI (pounds per square inch) for the pilot, and 3-20 PSI for the burner. After purge, an emergency shut down valve (not shown) and pilot solenoid valve 50 may open, allowing the gas through the pilot line and sparking the pilot. Once the controller 53 confirms that there is a flame in the pilot head (main burner), the solenoid 51 in the main and/or loading line may open. In the loading line, the fuel gas may flow through a restriction in a speed control valve that slows the flow of gas to the main burner valve. In response, the main burner valve may open progressively to allow the gas in the main line to the burner, thereby supporting safe and steady lighting of the burner. During normal operation, the controller 53 may regulate the temperature by closing/opening solenoid(s) in the main line. During shutdown, the controller 53 may send a signal to all the solenoids, such as solenoids 50 and 51, to close. The closing of the solenoid(s) 50 in the pilot line blocks the fuel gas flow to the pilot burner, thereby extinguishing the pilot flame. The closing of the solenoid(s) 51 in the loading line stops the fuel gas flow to the main burner valve which would close and block the flow to the main burner, thereby extinguishing the main burner flame. The above sequence and description of controlled burner operation is one example of how a burner may be operated in the field, and it should be understood that other ways of operating a burner may be used, including methods that do not involve a burner controller, such as in the case of a manually operated burner.

In cold climates, the freezing of fuel lines may interrupt or restrict proper operation of various oilfield applications. A gaseous fuel line may freeze or clog due to the formation of hydrates in the gaseous fuel. Fuel line freezing may cause damage to equipment or loss of fluidity of oil. In the absence of active hydrate reduction, gas hydrates can form in tubes and valves, causing plugging, leading to high operational expenditures, as well as precarious safety conditions. Freezing can occur in the line when there is water present in the gas, and temperatures drop below the freezing point of the water in the line. Freezing may also occur with the presence of hydrates above the freezing point. Hydrates may freeze above the freezing point due to the high pressure found within a natural gas pipeline for example. There is a direct relationship between the pressure and temperature of a gas line with regards to freezing, meaning that when the temperature of the line is relatively low, hydrates may be able to form at lower temperatures. When lower temperatures are experienced, it becomes more likely that hydrate formation will occur.

Various forms of hydrate control may be used to address hydrate problems in burner gas supply. Several types of inhibition methods exist, such as environmental, thermodynamic, and kinetic inhibition methods. A simple environmental inhibition method is to dry the gas before it is cooled, i.e., to remove the water and hydrates so they cannot form. Drying gas may involve adsorption onto, for example, silica gel, or cooling and condensation, absorption of water into alcohols, or adsorption onto hydroscopic salts. Environmental inhibition may not be a practical solution at a well site, particularly one that uses produced gas to supply an onsite oilfield burner. In other cases, physical removal methods may be used, such as pigging, scraping, jetting, or cleaning solid hydrates out of a system.

Thermodynamic inhibition may include one or more of the following methods: heating the gas, decreasing pressure in the system, injecting salt solutions, and injecting alcohol, glycol, or other chemical inhibitors. Heat may be provided to the hydrate-formation zone using electrical-resistance heating via cables connected to a transformer. A salt (such as $CaCl_2$)) may be injected to reduce hydrate formation by lowering the chemical activity of water, and/or by lowering the solubility of gas in water. Other chemical inhibitors may be used, with the most common chemical additives used to control hydrates in gas production systems being methanol, ethylene glycol, or triethylene glycol at a sufficiently high enough concentration. Thermodynamic inhibitors may have the effect of shifting the hydrate formation loci to the left, causing the hydrate formation point to be displaced to a lower temperature and/or a high pressure. One drawback to chemical inhibition techniques is the large quantity of methanol or glycol required. This impacts both operating costs and logistics, particularly important for offshore wells and pipelines. For example, when a fuel line is frozen, it is common to inject a large batch of methanol to clear ice in the line, however this batch injection of methanol may result in a large waste of chemicals, potentially being released into the environment. The injection may further waste chemicals and cause environmental issues when the injection continues despite the burner being turned off. Methanol is a commonly used chemical inhibitor for various reasons, including that methanol has a relatively low viscosity and surface tension, which makes effective separation easy at cryogenic conditions (below −13° F.). In many cases hydrate plug formation is prevented by the addition of glycols (usually ethylene glycol because of its lower cost, lower viscosity, and lower solubility in liquid hydrocarbons) to depress the hydrate formation temperature. But in order to be effective, glycols may need to be added at rates of up to 100% of the weight of water. Since glycols are expensive inhibitors, there is a definite need for extra, costly, and space consuming, onshore or offshore plants for their regeneration.

Another chemical inhibitor is a kinetic hydrate inhibitor. A kinetic inhibitor may include a relatively low-dosage chemical that one or more of prevents the growth of hydrate nuclei or prevents the agglomeration of nuclei into large crystals (also called a threshold hydrate inhibitor). Such compounds may include primarily quaternary ammonium salts, such as polymeric n-vinyl-2-pyrrolidone, polymers such as methanol-based solutions of a n-vinyl, n-methyl acetamide-covinyl caprolactam ("VIMA-VCap") polymer, non-polymeric gas hydrate inhibitors, borate-crosslinked gel systems, and others.

Referring to FIG. 1, a system 10 is illustrated having a hydrate-inhibiting chemical supply line 68 and a control valve 32. The supply line 68 may be connected between a storage tank 52 and a gaseous fuel line 46. The line 46 may be connected to an oilfield burner 48. The control valve 32 may be connected to control flow in the hydrate-inhibiting chemical supply line 68, in response to the operation of the oilfield burner 48. A storage tank connector 76 may be present for connecting the line 68 in use to the storage tank 52 containing hydrate-inhibiting chemicals. A gaseous fuel line connector 66 may be present for connecting in use to the gaseous fuel line 46 to the oilfield burner 48. In use, system 10 may be operated to reduce hydrate formation in a gaseous fuel line 46 to the burner 48. Gaseous fuel may be supplied, for example from a source of fuel 44 through line 46, to operate the burner 48. Hydrate-inhibiting chemicals may be supplied to the gaseous fuel, for example from storage tank 52 through line 68 into the line 46. The supply of the hydrate-inhibiting chemicals may be controlled in response to the operation of the oilfield burner 48, for example using the control valve 32. Thus, hydrate-inhibiting chemicals may be supplied in a controlled fashion to the gaseous fuel.

Figure 2:
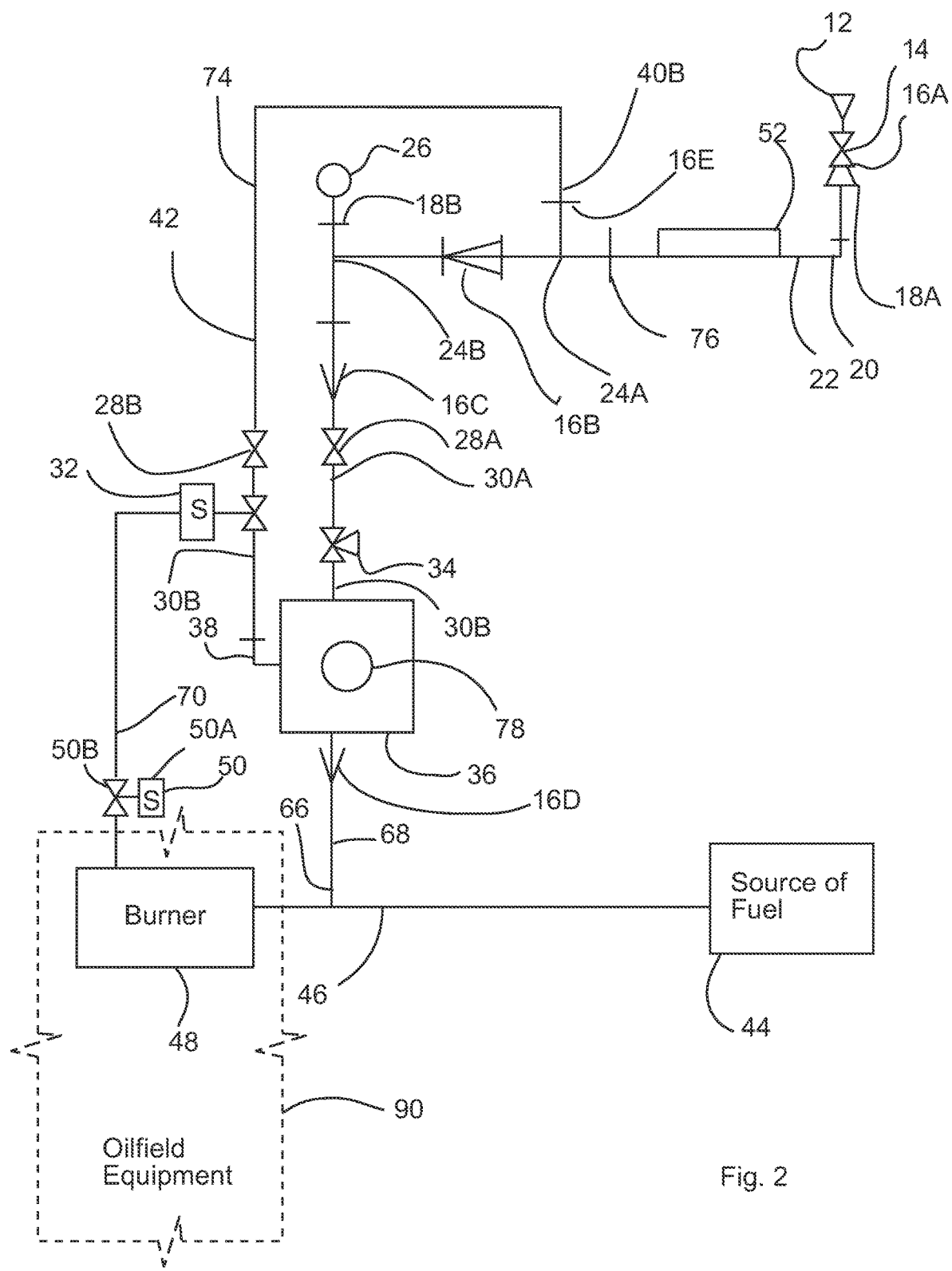
FIG. 2 is a schematic of another system of supplying hydrate-inhibiting chemical(s) to a gaseous fuel supplied to a burner, in an oilfield application, similar to the system of FIG. 1 except that a control valve for the chemical supply is located on a pressure equalizing tube of the system.
Figure 3:
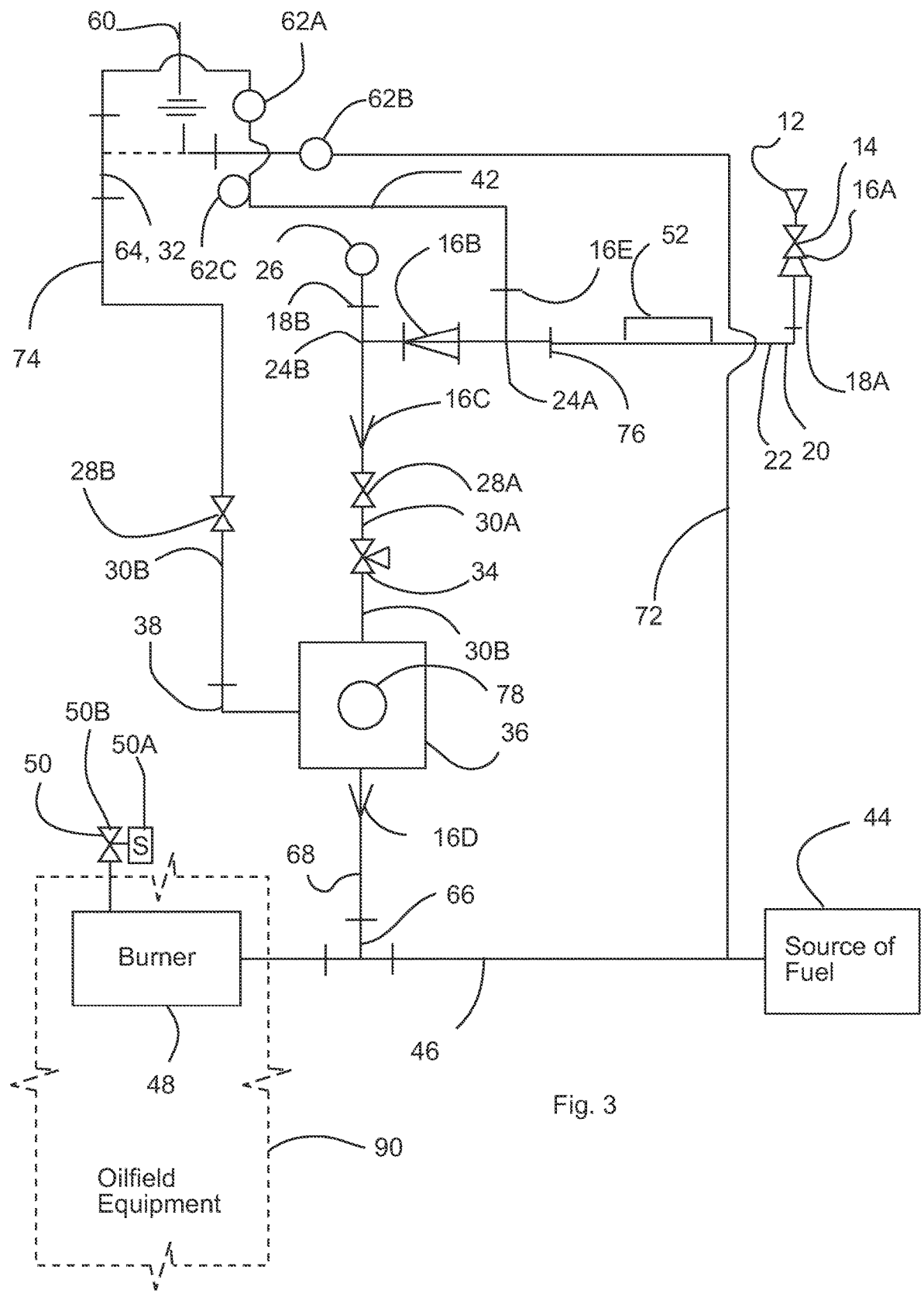
FIG. 3 is a schematic of another system of supplying hydrate-inhibiting chemical(s) to a gaseous fuel supplied to a burner, in an oilfield application, with chemical supply controlled by a pressure control valve with a pressure connection to the gaseous fuel line.

Referring to FIGS. 1-3, the system 10 may be used to supply any of various suitable hydrate-inhibiting chemicals to the gaseous fuel line 46. In some cases, a suitable hydrate-inhibiting chemicals may act to lower the hydrate formation temperature of the gas. The hydrate-inhibiting chemicals may comprise methanol, which is a commonly used hydrate-inhibiting chemical, for example in liquid form. The system 10 may be used to inject other chemicals such as ethylene glycol, de-waxing chemicals, various alcohols, or salt solutions, as desired.

Referring to FIG. 1, the control valve 32 may be connected in such a way that it responds to the on and off settings of the oilfield burner 48. In some cases, the control valve 32 is connected to turn on and off when the oilfield burner 48 is on or off, respectively. Responsive or feedback control may allow the control valve 32 to shut off, or in some cases reduce, the supply of the hydrate-inhibiting chemicals when the oilfield burner 48 is off and to turn on, or in some cases increase, the supply of the hydrate-inhibiting chemicals when the oilfield burner 48 is on. The response may be automatic, in the sense that user input is not required for the system 10 to adjust operation. Relative to a constant injection system, the disclosed system 10 may reduce cost when used with an oilfield burner 48, as the hydrate-inhibiting chemicals are supplied at operational delivery rates only when the burner 48 is in use.

Referring to FIG. 1, the control valve 32 may be connected to respond to a burner pilot valve 50 of the burner 48. The control valve 32 may be connected to control flow in the hydrate-inhibiting chemical supply line 68 in response to the burner pilot valve 50. The pilot valve 50 may communicate with the control valve 32 through a control line 70 connected between the burner pilot valve 50 and the control valve 32. The control valve 32 may be connected to turn off or decrease the supply of the hydrate-inhibiting chemicals when the burner pilot valve is 50 is off, and to turn on or increase the supply of hydrate-inhibiting chemicals when the burner pilot valve 50 is on.

Referring to FIG. 1, the system 10 may use electrical or electronic connections to link the operation of the valve 32 to the burner 48 operation. The control valve 32 may comprise a suitable valve actuator such as a solenoid 32A, which may open and close a valve part 32B, such as a ball or flapper valve part. The solenoid 32A and valve part 32B may be provided with other suitable parts such as a valve housing (not shown). A solenoid 32A may be controlled via electrical signals, which may be received from an external source, such as the pilot valve 50 and/or a burner controller (not shown). The control line 70 may be a conductor wire (for example within an insulative sheath) that transmits electrical signals or current between parts. The control valve 32 may be configured to close or otherwise decrease flow when an electrical signal is received, for example from the pilot valve 50, through the control line 70. The pilot valve 50 may comprise a suitable actuator, such as a solenoid 50A, which may open and close a valve part 50B, such as a ball or flapper valve part. The connection of an electrical control line 70 is one example of a way of connecting the control valve 32 and the burner pilot valve 50 in series, thereby allowing joint operation of the control valve 32 and the pilot valve 50. The control line 70 may connect the coils of both solenoids 50A and 32A so that when current is supplied or restricted to solenoid 50A, the same effect occurs to solenoid 32A. Other control linkages may be used, such as by using control line 70 as a signal receiver from a burner controller 53, so that controller 53 sends control signals to operate valve 32 by such control signals directly.

Referring to FIG. 1, the system 10 may be structured to equalize pressure with the gaseous fuel line 46. Equalizing pressure may allow the system 10 to supply chemicals into the line 46 across any range of supply pressures in line 46. The system 10 may have an equalization line 74 communicating, for example connected, between the gaseous fuel line 46 and the storage tank 52. In the example shown, the line 74 connects directly between line 46 and line 68, thus indirectly communicating with the tank 52. With equal pressure, the system 10 may supply chemicals with or without external energy input, such as in the form of a pump, although a pump may be used.

Referring to FIG. 1, the system 10 may be structured to feed hydrate-inhibiting chemicals to the fuel line 46 in a controlled and metered fashion. The system 10 may incorporate a metering valve 34. The metering valve 34 may comprise a suitable valve part such as a needle valve. A drip needle in a needle valve may efficiently deliver the hydrate-inhibiting chemical to the gaseous fuel line 46. A needle valve is a type of valve with a relatively small port and a threaded, needle-shaped plunger, to allow precise regulation of flow, although usually such valves are generally only capable of relatively low flow rates. A drip needle valve may allow the chemical to be inserted into the gaseous fuel line 46 through the fuel line 68 at a controllable rate. The system 10 may incorporate a sight glass 36, on the hydrate-inhibiting chemical supply line 68. The drip sight glass 36 may have an aperture or sight glass 78 through which visual, qualitative inspection of the flow of hydrate-inhibiting chemical flow can be made.

Referring to FIG. 1, the system 10 may be structured to gravity feed the hydrate-inhibiting chemicals into the gaseous fuel line 46. Gravity feed may be achieved by elevating the storage tank 52 above the input point of the line 68 into line 46, for example connector 66, which thus allows for the gravity metering of the hydrate-inhibiting chemicals into the gaseous fuel line 46. Gravity feed may simplify the structure and operation of the system 10, because no pump or relative pressurization may be required to feed chemicals.

Referring to FIG. 1, the system 10 may include various parts for operation. The storage tank 52 may have suitable connections and/or vents for proper operation. A plug 12 (such as hex plug) may be provided to pressurize an inlet into the tank 52. The inlet may have a valve 14, such as a threaded ball valve. The valve 14 may communicate with a swage fitting 16A, and/or a bushing 18A. A valve 14 may allow the storage tank 52 to become pressurized as soon as the burner pilot valve 50 becomes activated, while still being able to remain gravity metered. The tank 52 may need to be able to be pressurized in order to contain methanol, one of the most commonly used hydrate-inhibiting chemicals. A suitable connector, such as a pipe 22 and elbow connector 20 may be used. The tank 52 may be connected to supply to line 68 via a connector 76, such as a tee 24A. The tee 24A is one way to connect the line 68 to the equalization line 74. The connector 76 may connect to pipe 42 of line 74 via a swage fitting 16E. The equalization line 74 may have a valve 28B, such as a ball valve, which may connect pipes 42 and 30B of line 74. The line 74 may connect to line 68 by connecting, for example through a suitable fitting 38 (shown as an elbow) to the drip sight glass 36. The connector 76 may connect to line 68 in a suitable fashion, such as via a swage fitting 16B. The fitting 16B may connect to supply line 68 via a connector, such as a tee 24B. The tee 24B (or other connector) may have a vent or sensor, such as a pressure gauge 26. The gauge 26 may connect to tee 24B via a bushing 18B. A pressure gauge 26 may be used to ensure that there are no leaks or pressure changes that could affect the operating condition the system 10. A shutoff valve 28A may be incorporated at a suitable point in the system 10, such as between swage fitting 16C and control valve 32. In the example shown, the swage fitting 16C connects tee 24B to valve 28A. The valve 28A may feed the valve 32, for example by a nipple 30A. The metering valve 34 may receive supply from valve 32 to supply chemicals into drip sight glass 36. The glass 36 may connect to connector 66 for example via a swage fitting 16D. The burner 48 may be connected to receive fuel, for example natural gas, from a source of fuel 44, such as a tank or well, via supply line 46. The burner 48 may use a controller 53, which operates a main and pilot burner, for example by controlling a main burner solenoid 51 and a pilot solenoid 50A. The burner 48 may be oriented to provide output heat to oilfield equipment 90. In some cases, a heat exchanger (not shown) may be used, for example glycol tubing from burner 48 to oilfield equipment 90, if the equipment 90 is spaced from the burner 48 sufficiently to do so. Standard or other piping or other parts may be used. In some cases, the system 10 may mount external to a housing where the burner 48 is located, and in other cases the system 10 may be mounted internally. The system 10 may be held or installed by a suitable method, such as using a fabricated bracket, fastened to the vessel or housing via hangers with tubing going ground through a bulk head into the housing. All associated tubing downstream of the inspection point (drip sight glass) may be sloped to the pilot. The pilot may slope toward the nozzle end. One, two, or more drops (for example 2 mL) of chemical may escape with the solenoid closes. Metering may remain the same indefinitely, unless clogged by a foreign object. The system 10 may work with a suitable power source, such as a 12 or 24 volt DC (direct current) supply, or an AC (alternating current) supply such as 120 volt AC.

Referring to FIG. 2, another embodiment of a system 10 is illustrated. In the example shown the system 10 is the same as the system 10 in FIG. 1 except with certain features differing. As seen in FIG. 2, the control valve 32 may be located on the equalization line 74. Having the control valve 32 on the equalization line 74 is a suitable mechanism to link system 10 supply of chemicals to fuel supply to the burner 48. The valve 32 may create a vacuum in the system 10 between the control valve 32 and the chemical supply line 68, preventing the flow of liquid when the control valve 32 is in the off position.

Referring to FIG. 3, another embodiment of system 10 is illustrated, and that uses a mechanical or pressure connections to link the operation of the valve 32 to the burner 48 operation. In the example shown, the system 10 comprises a pressure control valve 64 (control valve 32). The pressure control valve 64 may be operated via a pressure line 72 connected between the gaseous fuel line 46 and the pressure control valve 64. The pressure control valve 64 may comprise a suitable valve, such as a three-way pilot valve. A pressure control valve operates as a hydraulic or pneumatic valve. The pressure control valve 64 may control the supply of the hydrate-inhibiting chemicals in response to pressure of gaseous fuel line 46 supplied to the oilfield burner 48. When the burner 48 is turned off, the pressure in the fuel line 46 will decrease, causing the pressure control valve 64 to close and eventually decrease or turn off the supply of hydrate-inhibiting chemicals. When the burner 48 is turned on, the pressure in the fuel line 46 will rise, causing the pressure control valve 64 to open and increase or turn on the supply of hydrate-inhibiting chemicals. The pressure control valve 64 may be intended for use in areas lacking a significant amount of electricity, as the system 10 is then able to function without electricity.

Referring to FIG. 3, the system 10 is the same as system 10 in FIG. 1 with several differences stemming from the use a pressure control valve 64. The valve 64 may be at a suitable location, for example on the equalization line 74. The control line 72 may extend from line 46 to valve 64, and may communicate with one or more ports 62B. The valve 64 may have a vent 60 for relief and venting of pressure in the pilot/control line 72. The equalization line 74 may include piping 42, which may have one or more 62A, and 62C.

Referring to FIG. 3, one example of a suitable pressure control valve 64 is an AMOT™ 4057 pressure control valve. AMOT™ Models 4057 and 4457 are 3-way valves that have been developed for use in manual and automatic hydraulic or pneumatic control systems. They offer versatility in operating requirements and allowable pressure limits. For a ¼" size control valve, they offer exceptional flow capacity. Such a valve offers one or more of balanced force design pressure, can be applied to any port center dead spot-std, port overlap-optional, arranged for panel or bracket mounting, and available in Aluminum or 316 Stainless Steel. In the example shown, when the pilot supply drops or is lost, port 62B loses its automatic latch, killing ports 62A and 62C thus killing the equalization line, stopping the drip. The AMOT™ models are examples of spring activated devices that lose control via pressure loss.

The system 10 may be packaged at least in part as a kit comprising the hydrate-inhibiting chemical supply line 68 and the control valve 32. The kit may contain the storage tank connector 76 and/or the fuel line connector 66 to allow the system 10 to be installed to the desired gaseous fuel line 46. The kit may include an equalization line 74, and other parts, such as all parts shown between the connectors 76 and 66.

LIST OF PARTS

12. Hex Plug
14. THRD Ball Valve CSA
16. SWAGE
18. Bushing
20. ZM THRD 90° Elbow
22. SEH 40 Pipe
24. THRD Tee
26. PSI Pressure Gauge
28. CSA Ball Valve
30. Nipple (4350 PSI)
32. Control Valve/Methanol Rated Solenoid 24 VDC
34. Metering valve (5000 PSI)
36. Site Glass/Drip Needle (1400 PSI) (304 Internals)
38. Street Elbow (3000 PSI)
42. 0.035 wall SS Tubing
44. Source of Fuel for Gaseous Fuel Line
46. Gaseous Fuel Line
48. Oilfield Burner
50. Burner Pilot Valve
52. Storage Tank
54. F×F CSA B-Valve
56. Tube×NPT ST
58. NPT STR
60. Vent
62. Port
64. Pressure control valve/Three-way pilot valve In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A system comprising:
    an oilfield burner;
    a gaseous fuel line connected to the oilfield burner;
    a storage tank containing hydrate-inhibiting chemicals;
    a hydrate-inhibiting chemical supply line connected between the storage tank and the gaseous fuel line;
    a control valve connected to control flow in the hydrate-inhibiting chemical supply line in response to the operation of the oilfield burner; and
    in which the control valve comprises a pressure control valve.

2. The system of claim 1 in which the control valve is connected to turn on and off when the oilfield burner is on or off, respectively.

3. The system of claim 1 in which:
    the oilfield burner has a burner pilot valve; and
    the control valve is connected to control flow in the hydrate-inhibiting chemical supply line in response to the burner pilot valve.

4. The system of claim 3 further comprising a control line connected between the burner pilot valve and the control valve.

5. The system of claim 3 in which the control valve and the burner pilot valve are connected in series.

6. The system of claim 1 in which the control valve comprises a solenoid.

7. The system of claim 1 in which the pressure control valve is operated via a pressure line connected between the gaseous fuel line and the pressure control valve.

8. The system of claim 7 in which the pressure control valve comprises a three way pilot valve.

9. The system of claim 1 further comprising an equalization line connected between the gaseous fuel line and the storage tank or hydrate-inhibiting chemical supply line to equalize gas pressure.

10. The system of claim 9 in which the control valve is located on the equalization line.

11. The system of claim 1 further comprising a drip sight glass on the hydrate-inhibiting chemical supply line.

12. The system of claim 1 in which the hydrate-inhibiting chemicals comprise liquid methanol.

13. The system of claim 1 structured to gravity feed the hydrate-inhibiting chemicals into the gaseous fuel line.

14. A kit comprising the hydrate-inhibiting chemical supply line and control valve of the system of claim 1.

15. A system comprising:
- an oilfield burner;
- a gaseous fuel line connected to the oilfield burner;
- a storage tank containing hydrate-inhibiting chemicals;
- a hydrate-inhibiting chemical supply line connected between the storage tank and the gaseous fuel line;
- a control valve connected to control flow in the hydrate-inhibiting chemical supply line in response to the operation of the oilfield burner; and
- an equalization line connected between the gaseous fuel line and the storage tank or hydrate-inhibiting chemical supply line to equalize gas pressure.

16. The system of claim 15 in which the control valve is located on the equalization line.

17. The system of claim 15 in which the control valve is connected to turn on and off when the oilfield burner is on or off, respectively.

18. The system of claim 15 in which:
- the oilfield burner has a burner pilot valve; and
- the control valve is connected to control flow in the hydrate-inhibiting chemical supply line in response to the burner pilot valve.

19. The system of claim 18 further comprising a control line connected between the burner pilot valve and the control valve.

20. The system of claim 18 in which the control valve and the burner pilot valve are connected in series.

\* \* \* \* \*